United States Patent
Eberts et al.

(10) Patent No.: US 10,594,133 B2
(45) Date of Patent: Mar. 17, 2020

(54) COMMUNICATION BUS OVERVOLTAGE PROTECTION

(71) Applicant: Hamilton Sundstrand Corporation, Charlotte, NC (US)

(72) Inventors: Christopher Charles Eberts, Chandler, AZ (US); Joseph A. James, Tempe, AZ (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 172 days.

(21) Appl. No.: 15/633,420

(22) Filed: Jun. 26, 2017

(65) Prior Publication Data

US 2018/0375323 A1    Dec. 27, 2018

(51) Int. Cl.
*H02H 7/26* (2006.01)
*B64D 45/02* (2006.01)

(52) U.S. Cl.
CPC ............. *H02H 7/268* (2013.01); *B64D 45/02* (2013.01); *B64D 2221/00* (2013.01)

(58) Field of Classification Search
CPC ..... H02H 7/268; B64D 45/02; B64D 2221/00
USPC ........................................................ 307/9.1
See application file for complete search history.

(56) References Cited

U.S. PATENT DOCUMENTS

| | | | |
|---|---|---|---|
| 3,978,393 A | 8/1976 | Wisner et al. | |
| 4,932,071 A | 6/1990 | Arndt et al. | |
| 8,300,373 B2 | 10/2012 | Morrish | |
| 8,570,697 B2 * | 10/2013 | Stevens | H02H 3/20 361/86 |
| 8,724,276 B2 * | 5/2014 | Igl | H02H 9/045 361/111 |
| 8,908,340 B2 * | 12/2014 | Trumbo | H02H 9/04 361/56 |

* cited by examiner

*Primary Examiner* — Carlos Amaya
(74) *Attorney, Agent, or Firm* — Locke Lord LLP; Scott D. Wofsy; Judy R. Naamat

(57) ABSTRACT

An overvoltage protection arrangement includes a signal lead, a switch, and a comparator. The signal lead has a device segment and a bus segment. The switch is connected in series between the device segment and the bus segment. The comparator is operably connected to the switch to open the switch in response to sustained application of overvoltage to the bus segment of the signal lead. Aircraft electrical systems and methods of controlling voltage applied to electrical devices in electrical systems are also described.

22 Claims, 4 Drawing Sheets

COMMUNICATION BUS OVERVOLTAGE PROTECTION

BACKGROUND OF THE INVENTION

1. Field of the Invention

The present disclosure relates to overvoltage protection, and more particularly to overvoltage protection for communications buses.

2. Description of Related Art

Vehicles, like aircraft, commonly carry electrical devices. The electrical devices provide various functionality responsive to command inputs received through a communications bus, which extends through the vehicle and interconnects the electrical devices with user interfaces or controllers. The communications bus generally conveys the command input to electronics associated with the electrical device, typically through a low voltage command signal applied to the electronics through a signaling lead. The low voltage electronics can require overvoltage protection, such as can occur from a lightning strike or short between the vehicle power bus and the communications bus, typically with a fuse or positive temperature coefficient (PTC) device.

Fuses are generally single-use and require replacement after tripping. Where the fuse is contained within a line-replaceable-unit (LRU), restoration of functionality requires replacement of the LRU subsequent to the fuse tripping. PTC devices generate reset automatically after tripping, the overcurrent triggering a PTC heating/cooling cycle that disconnects and reconnects the electronics to the communications bus in response to the overvoltage. Because PTC devices reset automatically, PTC devices commonly provide overvoltage protection in circuits that are difficult to access or are in remote locations and where the associated heating can be tolerated.

Such conventional systems and methods have generally been considered satisfactory for their intended purpose. However, there is still a need in the art for improved overcurrent protection devices. The present disclosure provides a solution for this need.

SUMMARY OF THE INVENTION

An overvoltage protection arrangement includes a signal lead with a device segment and a bus segment, a switch, and a comparator. The switch is connected in series between the device segment and the bus segment. The comparator is operably connected to the switch to open the switch in response to sustained application of overvoltage to the bus segment of the signal lead.

In certain embodiments, the bus segment of the signal lead can be connected to a CAN-type communication bus. The bus segment of the signal lead can be connected to an ARINC-type communication bus. The signal lead can be a first signal lead and the overvoltage protection arrangement can include a second signal lead. The overvoltage arrangement can be configured to dissipate transient overvoltage and disconnect from sustained overvoltage by delaying comparison of the overvoltage with a reference voltage.

In accordance with certain embodiments, the switch can include a MOSFET with a gate, a source and a drain. The MOSFET source can be connected to the bus segment of the signal lead. The MOSFET drain can be connected to the device segment of the signal lead. The MOSFET gate can be connected to the comparator. It is contemplated that the comparator have an output terminal. The comparator output terminal can be connected to the MOSFET gate such that application of voltage at the comparator output causes the MOSFET to disconnect the device segment from the bus segment of the signal lead.

It is contemplated that the comparator can include an input terminal and a reference voltage terminal. The comparator input terminal can be connected to the signal lead bus segment. A resistor-capacitor (RC) timing circuit can be connected to the comparator input terminal. A diode OR'ing arrangement can connect the input terminal to the first and second signal leads. A reference voltage source can be connected to the reference voltage terminal of the comparator.

It is also contemplated that, in accordance with certain embodiments, a Zener diode can be connected between the signal lead device segment and the output terminal of the comparator. A transient voltage protection (TVS) circuit can be connected to the device segment of the signal lead. The TVS circuit can include a transorb of Zener diode dissipating transient overvoltage. The TVS circuit can be contained within a heat-sensitive or flammable environment.

An aircraft electrical system includes an electrical device, a power bus connected to the electrical device, and an overvoltage protection arrangement as described above. The device segment of the signal lead connects the switch to the electrical device and is electrically isolated from the power bus. The comparator is arranged to open the switch upon application of sustained overvoltage corresponding to voltage of power carried by the power bus. In certain embodiments the electrical device can be contained within flammable or explosive atmosphere. In accordance with certain embodiments the electrical device can include a fuel pump.

A method of controlling voltage applied to an electrical device includes receiving an overvoltage at a signal lead having device and bus segments connected by a switch. The overvoltage is dissipated in a TVS circuit for a transient time interval. If the overvoltage has a sustained time interval that exceeds the transient time interval the overvoltage is compared to a reference voltage. When the overvoltage exceeds the reference voltage a comparator operably connected to the switch opens the switch, disconnecting the device segment from the bus segment. In certain embodiments the switch can be closed when the comparison indicates that voltage applied to the signal lead is below the reference voltage.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
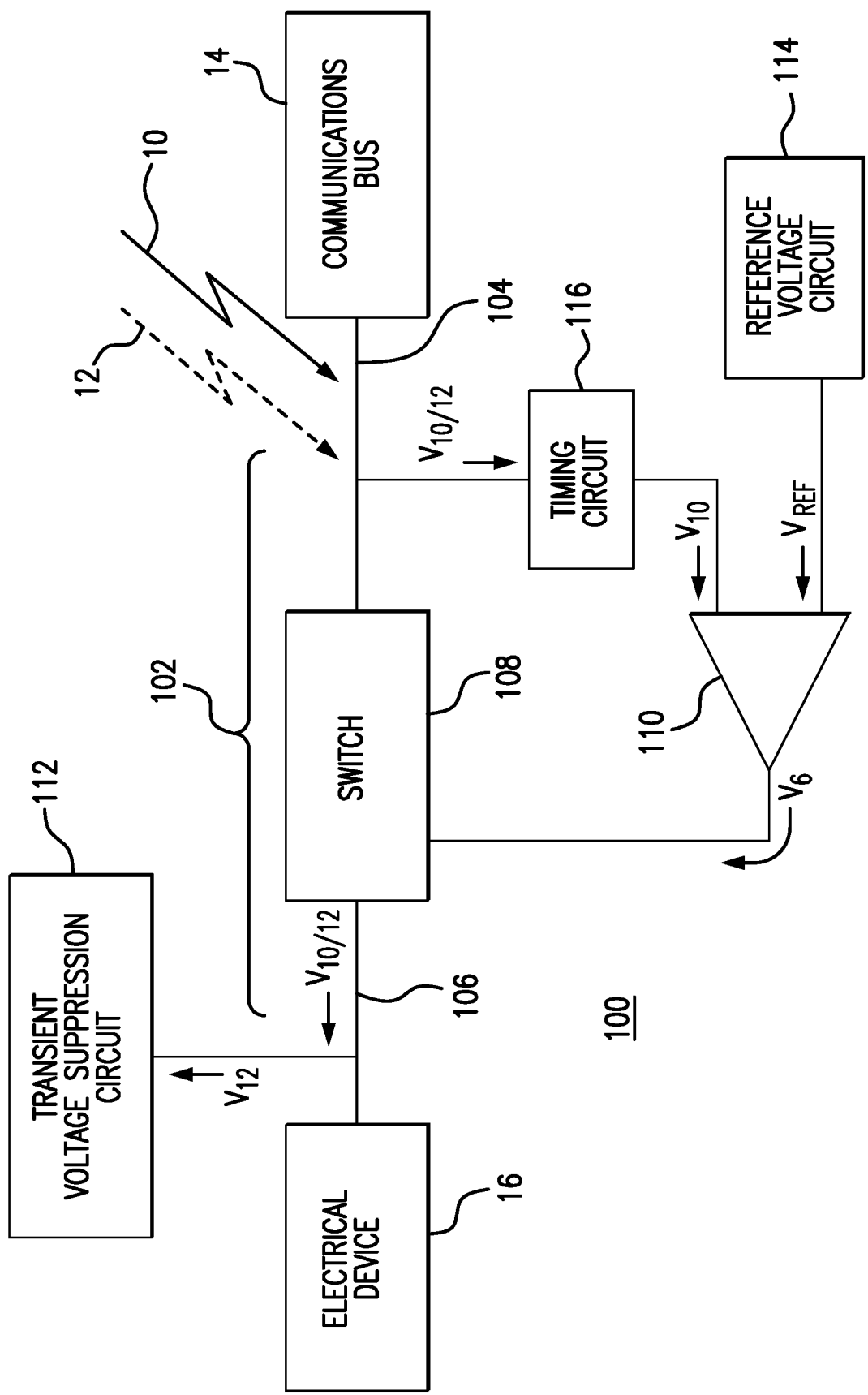
FIG. 1 is a block diagram of an exemplary embodiment of an overvoltage protection arrangement constructed in accordance with the present disclosure, showing a comparator operably connected to a switch for disconnecting an electrical device from a communication bus when sustained overvoltage is applied to the communications bus.

Reference will now be made to the drawings wherein like reference numerals identify similar structural features or aspects of the subject disclosure. For purposes of explanation and illustration, and not limitation, a partial view of an exemplary embodiment of an overvoltage protection arrangement in accordance with the disclosure is shown in FIG. 1 and is designated generally by reference character 100. Other embodiments of overvoltage protection arrangements, electrical systems with overvoltage protection arrangements, and methods of controlling voltage applied to electrical devices in accordance with the disclosure, or aspects thereof, are provided in FIGS. 2-4, as will be described. The systems and methods described herein can be used for providing overvoltage protection to electrical devices in electrical systems for both transient and sustained overvoltage, such as electrical devices disposed in potentially flammable environment on aircraft, though the present disclosure is not limited to electrical devices located in potentially flammable locations or to aircraft in general.

Referring to FIG. 1, overvoltage protection arrangement 100 is shown. Overvoltage protection arrangement includes a circuit 101 (shown in FIG. 2) configured to temporarily disconnect and automatically reconnect a device segment 106 from a bus segment 104 of a signal lead 102 in response to detection of sustained application of overvoltage, e.g., sustained overvoltage 12, to signal lead bus segment 104. The configuration of circuit 101 is such that circuit 101 detects sustained application of sustained overvoltage 12 to bus segment 104, temporarily disconnects a device segment 106 from bus segment 104, and thereafter automatically reset itself by reconnecting device segment 106 to bus segment 104.

In the illustrated exemplary embodiment, overvoltage protection arrangement 100 includes signal lead 102 with bus segment 104 and device segment 106, a switch 108, and a comparator 110. Switch 108 is connected in series between signal lead device segment 106 and signal lead bus segment 104. Comparator 110 is operably connected to switch 108 to open switch 108 in response to sustained application of an overvoltage 10 to signal lead bus segment 104.

Signal lead bus segment 104 is connected to a communications bus 14. Communications bus 14 is arranged to route instructions to an electrical device 16 connected to signal lead device segment 106. In the illustrated exemplary embodiment overvoltage protection arrangement 100, communications bus 14 and electrical device 16 are carried by an aircraft 18. In certain embodiments electrical device 16 can be housed within a heat-sensitive environment 20, such an environment containing or rated to contain flammable materials, e.g., an aircraft fuel cell or wing structure. In an exemplary embodiment electrical device 16 is a fuel pump 24 (shown in FIG. 2) disposed in communications with a controller or user input device (not shown for reasons of clarity) through communications bus 14 and signal lead 102.

Overvoltage protection arrangement 100 is arranged to provide overvoltage protection to electrical device 16 against both transient overvoltage 10 and sustained overvoltage 12. Protection is afforded by discriminating between transient and sustained overvoltage, comparator 110 taking no action in event of the former and opening switch 108 in the event of the latter. In this respect overvoltage protection arrangement 100 includes a transient voltage suppression (TVS) circuit 112, a reference voltage circuit 114, and a timing circuit 116. TVS circuit 112 is arranged to dissipate transient overvoltage communicated to TVS circuit 112 and is connected to signal lead device segment 106. Timing circuit 116 is arranged to apply over delay (or retard) application of voltages to comparator 110 and is connected between signal lead bus segment 104 and comparator 110. Comparator 110 is arranged to compare overvoltage applied thereto when the overvoltage is sustained and the comparison indicates that the overvoltage exceeds a selected voltage level. Reference voltage circuit 114 applies a reference voltage to comparator 110, which provides a substantially constant voltage to which a sustained overvoltage is compared.

Figure 2:
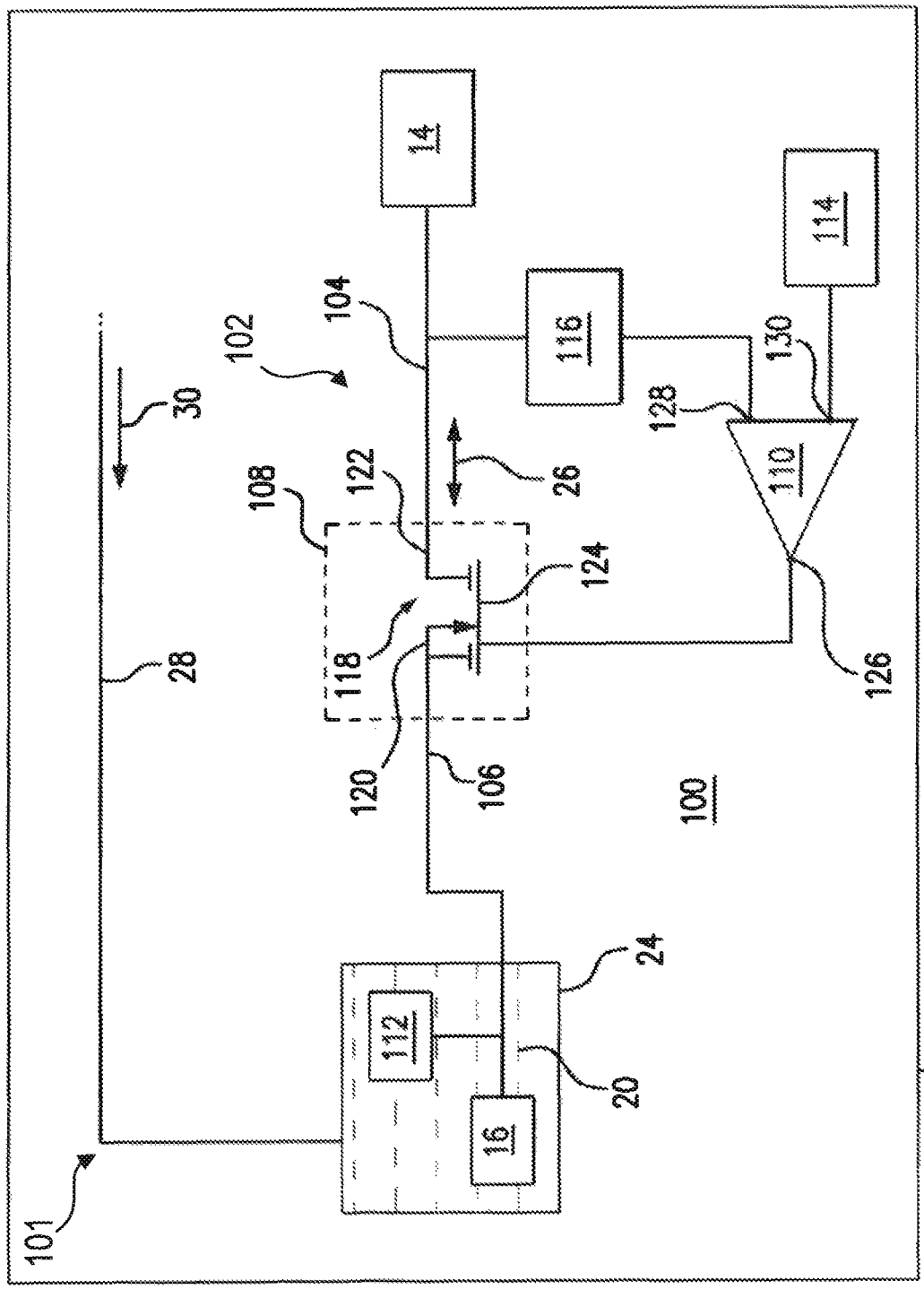
FIG. 2 is a circuit diagram of the overvoltage protection arrangement of FIG. 1, showing the connection of a MOSFET solid-state switch device to the comparator and signal lead.

Referring to FIG. 2, it is contemplated that signal lead 102 be arranged to carry signals 26 between communications bus 14 and electrical device 16. Signal lead 102 can include one or more conductors of small gauge (relative to a conductor of main power bus 28) arranged to carry signals 26 between communications bus 14 and electrical device 16. It is contemplated that signals 26 be of low voltage relative to a voltage 30 applied to conductors or main power bus 28. For example, main power bus 28 can be a 28-volt direct current (DC) power bus and communications bus 14 can be arranged to carry signals with magnitudes of about five (5) volts. In certain embodiments signal lead 102 can be a CAN-type signal lead arranged for communicating CAN-type data between communications bus 14 and electrical device 16 through switch 108 using signals 26. In accordance with certain embodiments, signal lead 102 can be an ARINC-type signal lead arranged for conveying ARINC-type data between communications bus 14 and electrical device 16 through switch 108 using signals 26.

Switch 108 can include a solid-state switch 118, such as a MOSFET or an IGBT device. In certain embodiments, solid-state switch 118 is single solid-state switch device, i.e., signal lead bus segment 104 having no intervening switches between solid-state switch 118 and electrical device 16 and/or single lead device segment 106 having no intervening switch devices between solid-state switch 118 and communications bus 14. In the illustrated exemplary embodiment solid-state switch 118 is a MOSFET device having a source 120, a drain 122, and a gate 124. Source 120 is connected to signal lead device segment 106 and drain 122 is connected to signal lead bus segment 104. Gate 124 is connected to an output terminal 126 of comparator 110 and is arranged to receive voltage applied thereto from comparator 110 to disconnect device segment 106 from signal lead bus segment 104. It is contemplated that the MOSFET be a depletion mode device, signal lead bus segment 104 being electrically connected to signal lead device segment 106 absent application of a voltage to gate 124, application of voltage to gate 124 opening solid-state switch 118 and electrically disconnecting signal lead device segment 106 from signal lead bus segment 104. Examples of suitable solid-state switch devices include BSS123 Field Effect Transistor devices, available from ON Semiconductor of Phoenix, Ariz.

Comparator 110 is configured to compare sustained voltage applied to signal lead bus segment 104 to a reference voltage received from reference voltage circuit 114. When the sustained voltage exceeds the reference voltage by a selected amount comparator 110 applies a gate voltage to gate 124 via comparator output terminal 126, thereby opening switch 108. The reference voltage is applied to a reference voltage terminal 130 of comparator 110. Examples of suitable comparators include LT1716 rail-to-rail comparator devices, available from Linear Technology of Milpitas, Calif.

The sustained voltage is applied to an input terminal 128 of comparator 110 after a delay interval, the delay interval being determined by timing circuit 116. In certain embodiments the delay interval of timing circuit 116 corresponds to the time interval for lightning transients as defined in RTCA/DO-160 G Change 1 of Dec. 16, 2014, the contents of which are incorporated herein in their entirety by reference. As will be appreciated, selecting a delay interval corresponding to the duration of lightening-driven voltage transients enables overvoltage protection arrangement 100 to discriminate between lighting-driven transient overvoltage events, which switch 108 communicates to TVS circuit 112 via signal lead device segment 106, and sustained overvoltage events, such as when power bus 28 short circuits to signal lead 102, which is not communicated to signal lead device segment 106.

Figure 3:
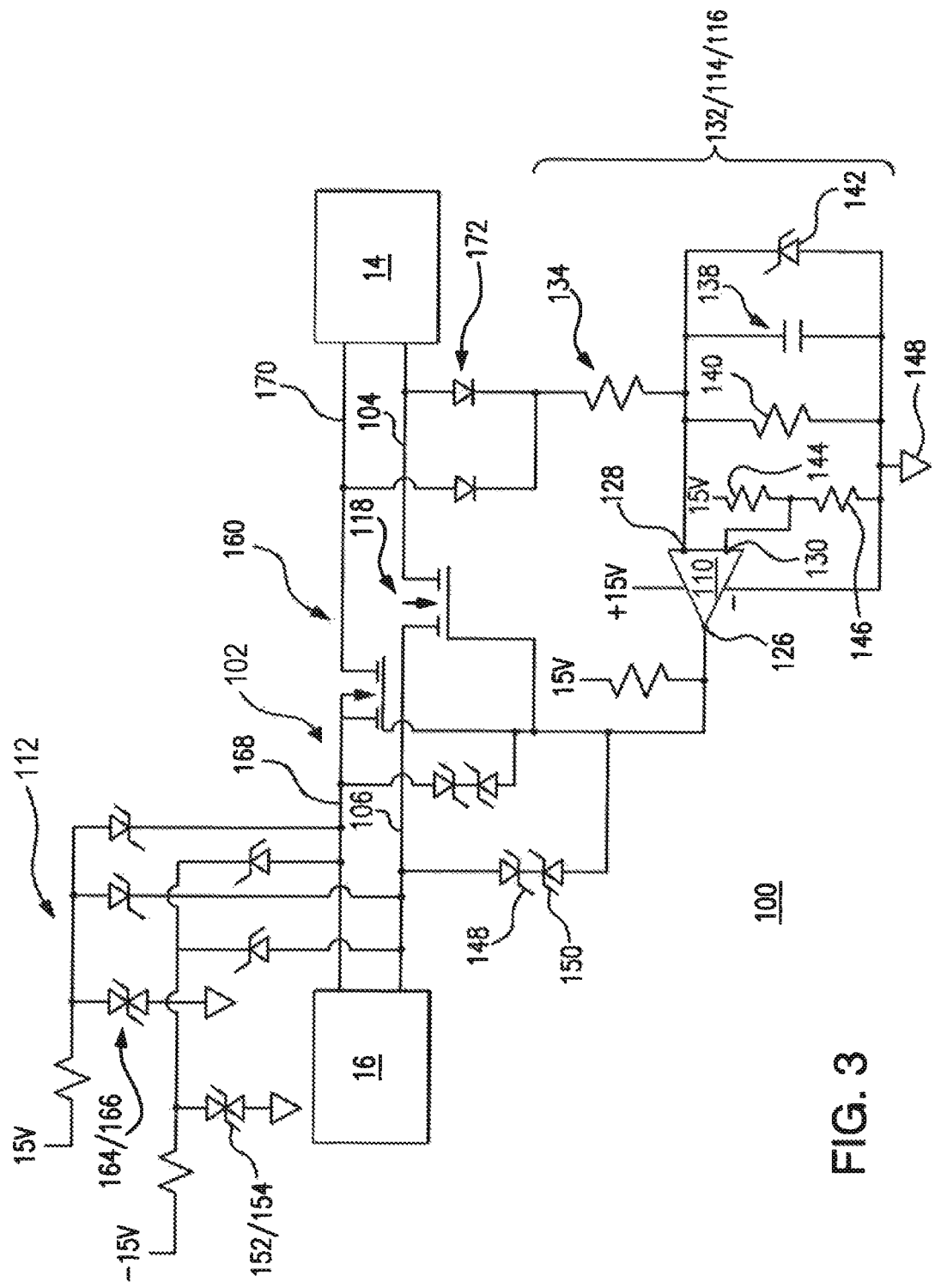
FIG. 3 is a circuit diagram of the overvoltage protection arrangement of FIG. 1, showing elements of the timing circuit, reference voltage circuit, transient voltage suppression circuit, and connection of the comparator to the signal lead device segment.

With reference to FIG. 3, overvoltage protection arrangement 100 is shown according to an exemplary embodiment. Timing circuit 116 includes a resistor-capacitor (RC) circuit 132. RC circuit 132 has a resistor 134 and a capacitor 138 arranged in series with one another. Resistor 134 is connected between signal lead bus segment 104 and capacitor 138. Capacitor 138 is arranged between resistor 134 and a ground terminal 148. Comparator input terminal 128 is connected between resistor 134 and capacitor 138 such that resistor 134 and capacitor 138 cooperate to retard application of overvoltage applied to signal lead bus segment 104 to comparator input terminal 128. It is contemplated that capacitor 138 have capacitance sufficient to retard application of overvoltage applied to comparator input terminal 128. Timing circuit 116 also includes a blocking resistor 140 and Zener diode 142, which are each connected in parallel with capacitor 138 to protect comparator 110 from sustained overvoltage that could otherwise exceed the rating of comparator 110.

Reference voltage circuit 114 includes a first trip voltage-set resistor 144 and a second trip voltage-set resistor 146. First trip voltage-set resistor 144 and second trip voltage-set resistor 146 are connected between ground terminal 148 and reference voltage terminal 130, and are arranged to set the selected voltage above which comparator 110 applies voltage to comparator output terminal 126. In the illustrated exemplary embodiment the selected reference voltage is about 15 volts, which corresponds voltages suitable for certain CAN-type and ARINC-type digital communication systems.

Comparator output terminal 126 is connected to signal lead device segment 106 through bi-directional diodes 148/150. Bi-directional diodes 148/150 are arranged serially between signal lead device segment 106 and comparator output terminal 126 such that the diode anodes are separated by the cathodes of each diode, and have breakdown voltages selected to limit voltage applied across gate 124 and source 120 such that the voltage remains below the $V_{GS}$ rating of solid-state switch 118 when sustained overvoltage from power bus 28 (shown in FIG. 2) is applied to signal lead 102. Examples of suitable bi-directional Zener diodes 148/150 include UMZ16K Zener diode devices, available from ROHM Semiconductor of Kyoto, Japan.

TVS circuit 112 is connected to signal lead device segment 106 and includes a TVS diode pair 152/154. TVS diode pair 152/154 is connected in series between signal lead device segment 106 and a ground terminal and are arranged to dissipate transient voltages communicated through solid-state switch 118 to the ground terminal. As will be appreciated by those of skill in the art in view of the present disclosure, TVS diode pair 152/154 need not be arranged to dissipate sustained overvoltage applied to signal lead 102 due to the above-described operation of solid-state switch 118 when sustained overvoltage is determined to be present. This eliminates the need for TVS circuit 112 to employ positive temperature coefficient (PTC) devices, causing TVS circuit 112 to generate relatively little heat in comparison to similarly rated TVS circuits employing PTC devices, thereby enabling overvoltage protection arrangement 100 to be used in heat sensitive environments.

In the illustrated exemplary embodiment signal lead 102 is a first signal lead 102 and overvoltage protection arrangement 100 includes a second signal lead 160. Second signal lead 160 is similar to first signal lead 102 with the difference that second signal lead has a polarity that is opposite to that of first signal lead 102. TVS circuit 112 includes a second TVS diode pair 164/166 connected to second signal lead device segment 168 for dissipating transient voltages communicated thereto, and diode OR'ng arrangement 172 connects both first signal lead bus segment 104 and a second signal lead bus segment 170 to comparator input terminal 128. As will be appreciated by those of skill in the art in view of the present disclosure, diode OR'ng arrangement 172 enables comparator 110 to disconnect both first signal lead device segment 106 and second signal lead device segment 168 in the event that sustained overvoltage is applied to either first signal lead 102 or second signal lead 160.

The signal lead can be a first signal lead and the overvoltage protection arrangement can include a second signal lead, the overvoltage protection arrangement being arranged to provide overvoltage protection to sustained and transient overvoltage by determining whether a given overvoltage event is a sustained or a transient overvoltage event.

Figure 4:
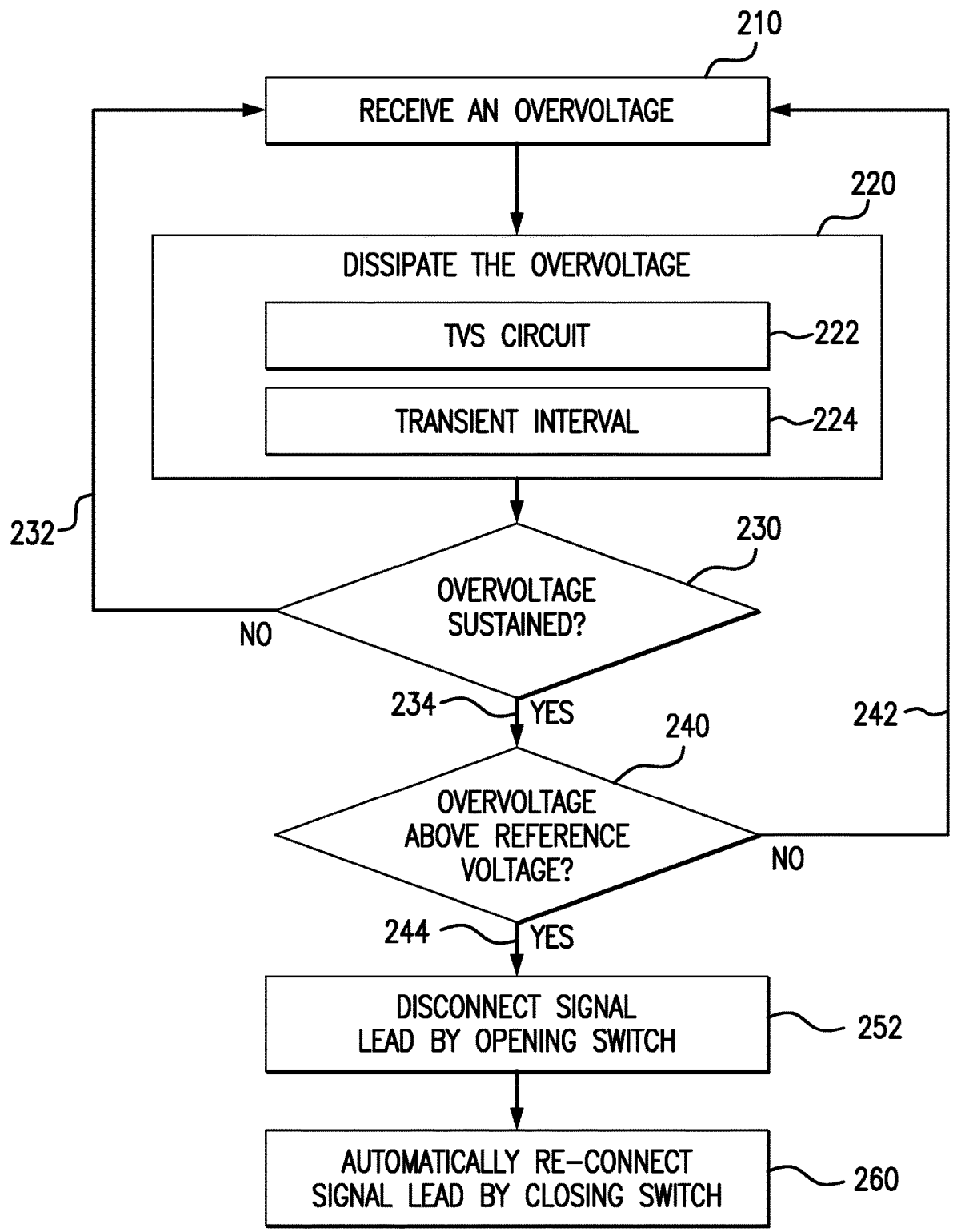
FIG. 4 is a flow chart of a method of controlling voltage applied to an electrical device, showing steps of the method.

With reference to FIG. 4, a method 200 of controlling voltage applied to an electrical device, e.g., electrical device 16, is shown. Method 200 includes receiving a voltage $V_{10/12}$, e.g., transient overvoltage 10 (shown in FIG. 1) or sustained overvoltage 12 (shown in FIG. 1), as shown with box 210. The voltage is received at a signal lead bus segment, e.g., signal lead bus segment 104 (shown in FIG. 1), and is communicated by a switch, e.g., switch 108 (shown in FIG. 1), to a signal lead device segment, e.g., signal lead device segment 106 (shown in FIG. 1).

The signal lead device segment applies the voltage to a transient suppression circuit, e.g., TVS circuit 112 (shown in FIG. 1), which dissipates the voltage, shown with box 220. Dissipation occurs using a non-PTC device, such as a transorb or Zener diode device, as shown with box 222, during a time interval corresponding to a transient overvoltage time interval, as shown with box 224.

Method 200 also includes determining whether the voltage is sustained, as shown with box 230. This is accomplished using a timing circuit, e.g., timing circuit 116 (shown in FIG. 1), which delays application of the voltage to a comparator, e.g., comparator 110 (shown in FIG. 1), that is operably connected to the switch. When the voltage is not sustained for a time interval exceeding a transient time interval, connectivity is maintained through the switch between the signal lead bus segment and device segment, as shown with arrow 232. When the voltage is sustained the voltage is compared to a reference voltage to determine whether the voltage is an overvoltage of sufficient magnitude to require disconnection of signal lead device segment from the signal lead bus segment, as shown with arrow 234 and box 240.

When the comparison indicates that the voltage does not exceed the reference voltage the signal lead device segment remains connected to signal lead bus segment, as shown with arrow 242. When the voltage exceeds a reference voltage VRef provided by a reference voltage circuit, e.g., by reference voltage circuit 114, the signal lead device segment is disconnected from the signal lead bus segment, as shown with arrow 244 and box 252. In certain embodiments the comparator applies a voltage to the switch gate, opening the switch, and electrically isolating the signal lead device segment from the signal lead bus lead. In accordance with certain embodiments the switch automatically re-connects the signal lead device segment to the signal lead bus segment, as shown with box 260.

Aircraft communications buses can require overvoltage protection for disconnecting electrical devices during sustained and transient overvoltage events. Transient overvoltage events, such as from lightning strikes, are relatively short and can be dissipated by devices that generate relatively small amounts of heat—like transorbs and Zener diode devices. Sustained overvoltage events, such as when a power bus shorts to the communication bus are longer than transient events and can require single use devices, like fuses, or resettable devices that generate relatively large amounts of heat, like PTC devices, to dissipate sustained overvoltage.

In applications where the fuse is not readily accessible, as can be the case in some line replaceable units, restoration of device functionality can require swapping out the device. And while the automatic reset capability of PTC devices makes them suitable in applications where the protected device isn't readily accessible, the heat generated can preclude their use in environments where heat generation is a concern, such as in potentially flammable environments.

In embodiments described overvoltage protection arrangements include a comparator operably connected to a switch for disconnection of the communication bus in the event of sustained overvoltage. The comparator determines whether voltage applied to the communication bus exceeds a reference voltage. The reference voltage is selected such that the communications bus remains connected when a sustained overvoltage has relatively small magnitude and is disconnected when the sustained overvoltage is high, e.g., when a power bus shorts to the communication bus. In certain embodiments the reference voltage is selected such that the comparator opens the switch when a 28-volt overvoltage has been applied to a low voltage, e.g., about 5-volt, communications bus. As will be appreciated by those of skill in the art in view of the present disclosure, the comparator can provide automatic reset functionality, eliminating the need to replace a fuse or an LRU containing a fuse. As will also be appreciated by those of skill in the art in view of the present disclosure, use of a comparator actuated disconnect switch can also provide overvoltage protection with relatively low heat generation, allowing the overvoltage protection arrangement to be housed within a heat-sensitive environment, such as a fuel cell or within the interior of an aircraft wing.

In certain embodiments, the overvoltage protection arrangement includes an RC timing circuit. The RC timing circuit allows the communications bus to remain connected to the electrical device during transient overvoltage events. Remaining connected, transient overvoltage events can be communicated to a lightening protection circuit connected between the communicate bus switch and the electrical device for dissipation, preventing the switch from application voltages potentially exceeding the $V_{ds}$ rating of the communications bus disconnect switch.

In accordance with certain embodiments, the input of the comparator can be OR'd to protect differential signals. In this respect the overvoltage arrangement can include two or more diodes connected to conductors of the signal lead bus segments. Each diode leg can include a diode with a cathode connected to the comparator input and an anode connected to the respective communication bus conductor, the respective diode being arranged to oppose current flow therethrough to the signal lead connected to the anode. Each diode leg can include a resistor configured to limit current flow from the cathode to the comparator input.

It is also contemplated that, in accordance with certain embodiments, the overvoltage protection arrangement can include a bi-directional Zener diode. The bi-directional Zener diode can be arranged between the switch device source and gate, thereby providing protection against negative transient overvoltage events that could otherwise exceed the $V_{gs}$ rating of the switch device.

The methods and systems of the present disclosure, as described above and shown in the drawings, provide for overvoltage protection with superior properties including automatic resettability, low heat generation from voltage dissipation relative to dissipation circuits employing PTC devices, and/or single state transient dissipation circuits. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An overvoltage protection arrangement, comprising:
    a circuit configured to temporarily disconnect and automatically reset itself by reconnecting a device segment from a bus segment of a signal lead in response to detection of sustained application of overvoltage to the signal lead bus segment, the circuit including:
    a switch connected in series between the device segment and the bus segment; and
    a comparator operably connected to the switch to open the switch in response to sustained application of overvoltage to the signal lead bus segment; and
    a timing circuit, wherein the timing circuit applies a delay to a voltage signal received from the bus segment so that the voltage signal is received at the comparator with an overvoltage only if it is not a transient.

2. The overvoltage protection arrangement as recited in claim 1, wherein the bus segment of the signal lead is connected to a CAN-type or ARINC-type communications bus.

3. The overvoltage protection arrangement as recited in claim 1, wherein the switch includes a MOSFET with a gate and the comparator includes an output terminal, wherein the gate is connected to the output of the comparator.

4. The overvoltage protection arrangement as recited in claim 3, wherein the MOSFET has a drain, wherein the drain is connected to the device segment of the signal lead.

5. The overvoltage protection arrangement as recited in claim 3, wherein the MOSFET has a source, wherein the source is connected to the bus segment of the signal lead.

6. The overvoltage protection arrangement as recited in claim 1, wherein the comparator has an input terminal, wherein the input terminal of the comparator is connected to the bus segment of the signal lead.

7. The overvoltage protection arrangement as recited in claim 6, wherein the timing circuit includes a resistor-capacitor (RC) timing circuit connected to the input terminal of the comparator.

8. The overvoltage protection arrangement as recited in claim 6, wherein the signal lead is a first signal lead and further comprising a second signal lead, wherein a diode OR'ing arrangement connects the first and second signal leads to the input terminal of the comparator.

9. The overvoltage protection arrangement as recited in claim 1, wherein the comparator has a reference voltage terminal, and further comprising a reference voltage source connected to the comparator reference terminal.

10. The overvoltage protection arrangement as recited in claim 1, wherein the comparator has an output terminal, and further comprising a Zener diode connected between the signal lead device segment and the comparator output terminal.

11. The overvoltage protection arrangement as recited in claim 1, further comprising a TVS circuit connected to the signal lead device segment for processing the voltage signal when it is a transient.

12. The overvoltage protection arrangement as recited in claim 11, wherein the TVS circuit includes a transorb-type dissipation device.

13. The overvoltage protection arrangement as recited in claim 10, where the TVS circuit does not include a positive temperature coefficient device for dissipating overvoltage.

14. An aircraft electrical system, comprising:
   an electrical device;
   a power bus connected to the electrical device;
   an overvoltage protection arrangement as recited in claim 1, wherein the device segment of the signal lead connects to the electrical device and is electrically isolated from the power bus.

15. The aircraft electrical system as recited in claim 14, wherein the overvoltage protection arrangement further comprises:
   a signal lead with a device segment and a bus segment;
   a switch connected in series between the device segment and the bus segment; and
   a comparator operably connected to the switch to open the switch in response to sustained application of overvoltage to the signal lead bus segment.

16. The aircraft electrical system as recited in claim 15, wherein the comparator is arranged to open the switch upon application of sustained overvoltage corresponding to voltage carried by the power bus, and overvoltage protection arrangement further comprising:
   a resistor-capacitor timing circuit connected between the signal lead bus segment and the comparator;
   a reference voltage circuit connected to the comparator;
   a transient voltage suppression (TVS) circuit connected to the signal lead device segment, wherein the TVS circuit includes a transorb or Zener diode for voltage dissipation; and
   a bi-directional Zener diode arrangement connected between the comparator output and the signal lead device segment.

17. The aircraft electrical system as recited in claim 16, wherein the TVS circuit is contained within a heat-sensitive environment.

18. The aircraft electrical system as recited in claim 16, wherein the TVS circuit is contained within flammable environment.

19. The aircraft electrical system as recited in claim 16, further comprising a diode OR'ing arrangement connecting the signal lead bus segment to the comparator.

20. A method of controlling voltage applied to an electrical device, comprising:
   applying a timing delay to a voltage signal received from a bus segment of a signal lead;
   comparing the voltage signal to a reference signal after the voltage signal was delayed by the applied timing delay, wherein due to the applied delay, only sustained application of overvoltage by the voltage signal to the bus segment is compared;
   as a function of comparing the voltage signal to the reference signal, temporarily opening a switch connected in series between a device segment of the signal lead and the bus segment for temporarily disconnecting the device segment from the bus segment; and
   automatically closing the switch to reconnect the device segment to the bus segment.

21. The method as recited in claim 20, further comprising:
   receiving an overvoltage at the signal lead;
   dissipating the overvoltage in a transient voltage overvoltage suppression circuit for at least a transient time interval,
   wherein the sustained application of overvoltage is for at least a sustained time interval, the sustained time interval being longer than the transient time interval.

22. The method of controlling voltage applied to an electrical device as recited in claim 21, wherein the switch is closed when the comparison indicates that voltage applied to the signal lead is below the reference voltage.

* * * * *